May 27, 1930.  W. J. MAYER  1,760,653
CAR SEAT
Filed April 21, 1928  3 Sheets-Sheet 1

Inventor:
William J. Mayer
by his Attorneys
Howson & Howson

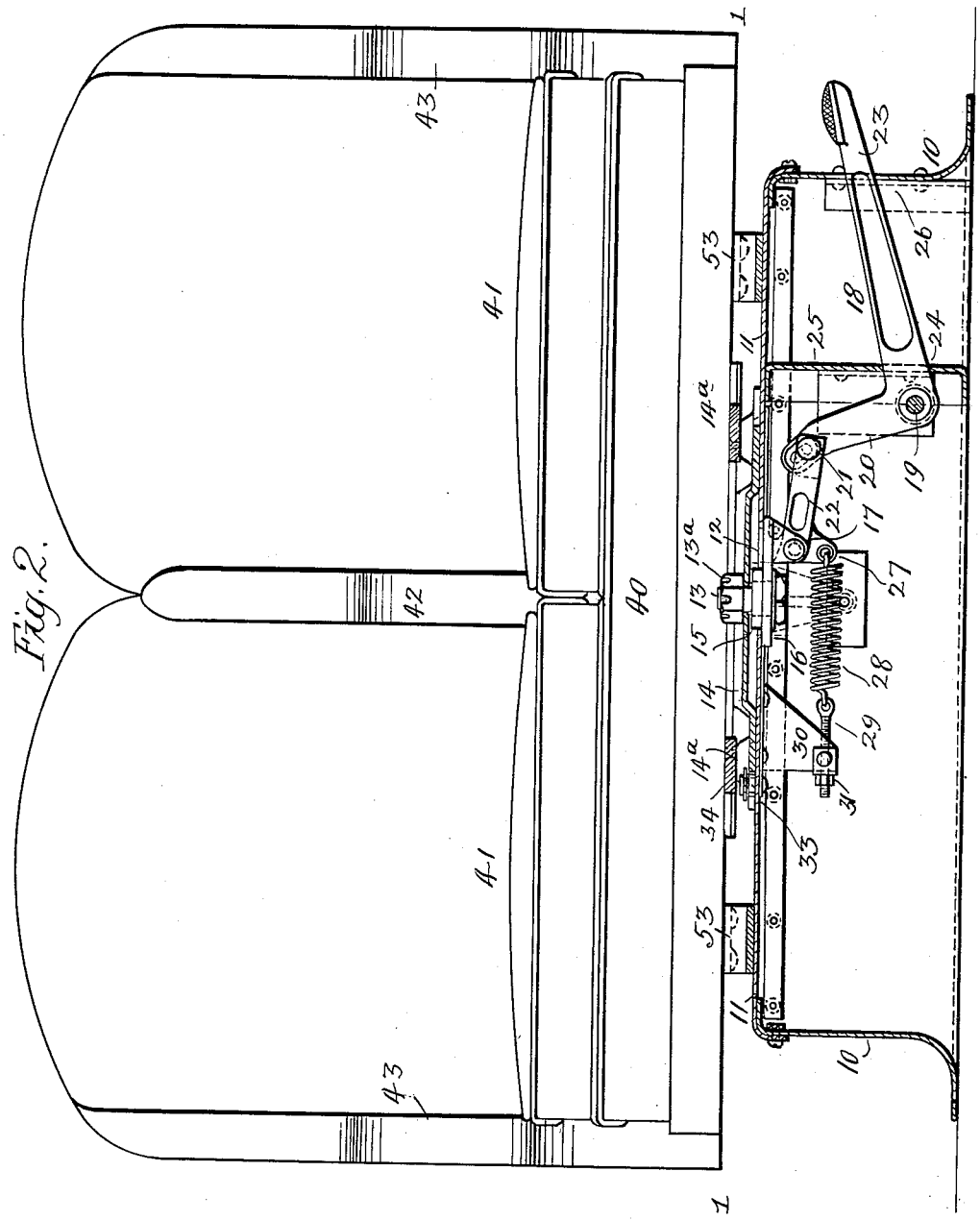

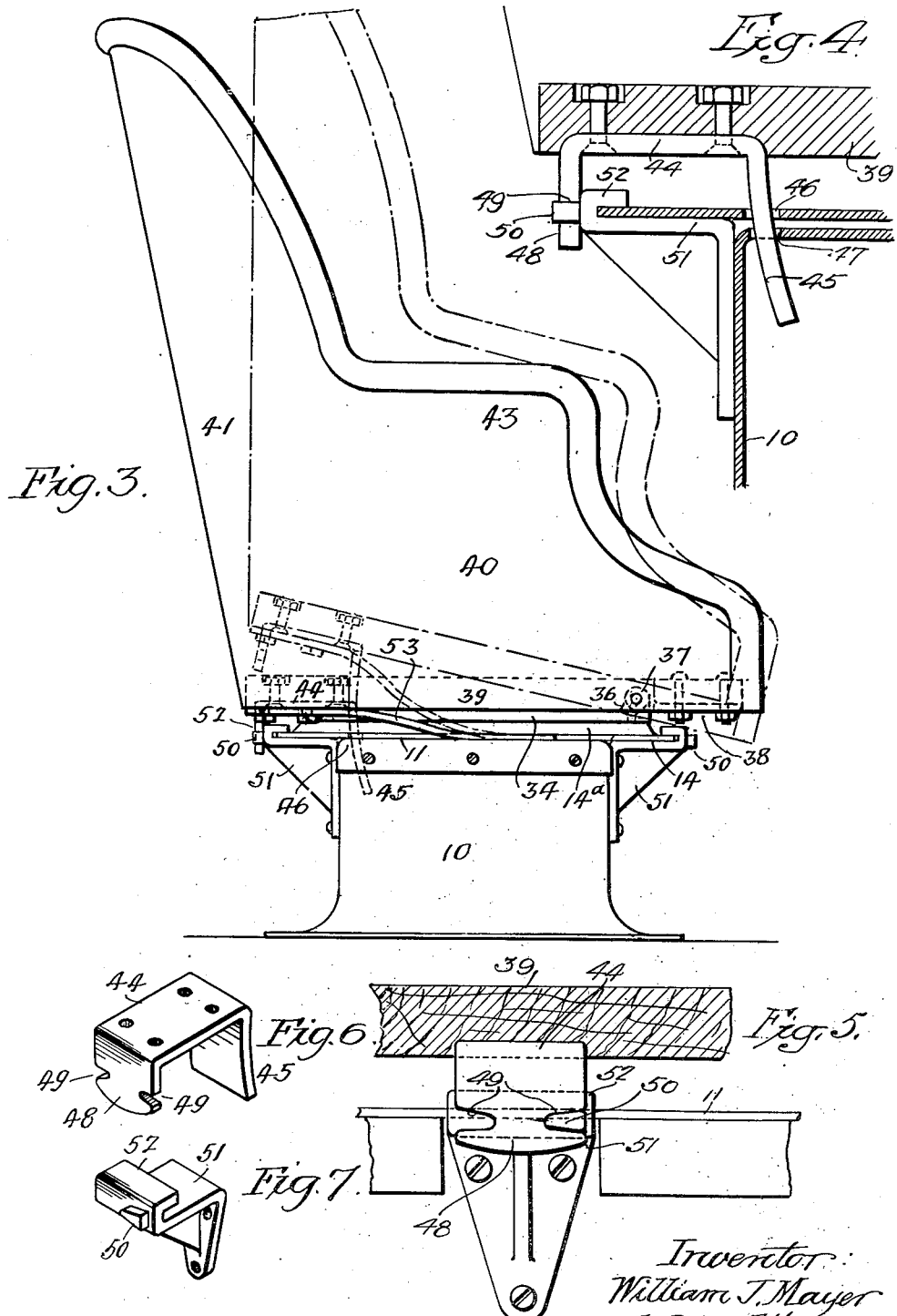

Patented May 27, 1930

1,760,653

UNITED STATES PATENT OFFICE

WILLIAM J. MAYER, OF PHILADELPHIA, PENNSYLVANIA, ASSIGNOR, BY MESNE ASSIGNMENTS, TO AMERICAN CAR AND FOUNDRY COMPANY, OF NEW YORK, N. Y., A CORPORATION OF NEW JERSEY

CAR SEAT

Application filed April 21, 1928. Serial No. 271,815.

My invention relates to certain improvements in car seats, and particularly the car seat illustrated in the patent granted to J. A. Brooks, No. 1,644,632, on October 4th, 1927.

The object of the present invention is to provide means for locking the seat section to the pedestal, and to provide means for counterbalancing, to a certain extent, the weight of the seat structure.

The invention also relates to certain details which will be fully described hereinafter.

In the accompanying drawings:

Fig. 2 is a front elevation of the seat structure, showing the base in section, on the line 2—2 of Fig. 1;

Fig. 3 is an end view;

Fig. 4 is an enlarged sectional view on the line 4—4, Fig. 1;

Fig. 5 is a rear view of the structure shown in Fig. 4;

Figs. 6 and 7 are detached perspective views showing details of the invention.

Figure 1:
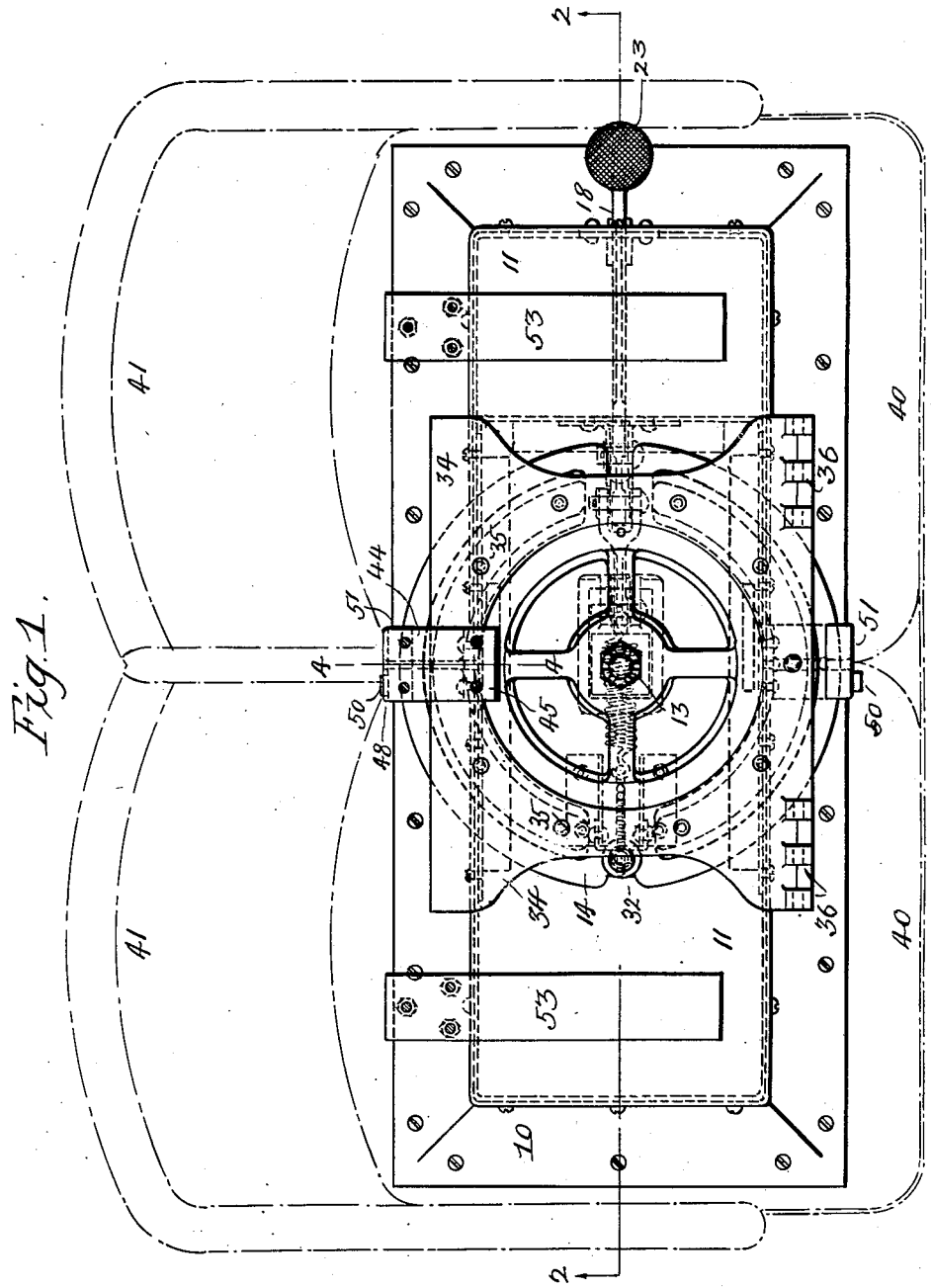
Fig. 1 is a sectional plan view on the line 1—1, Fig. 2.

Referring to the drawings, 10 is a base which is mounted on the floor of a car. The top 11 of the base forms a platform. In the top of the platform is an elongated opening 12 which is rectangular in the present instance. A projection 15, forming an integral part of a slide 16, is located in the elongated opening 12 and is arranged to slide therein. On the slide 16 are lugs 17.

18 is a foot-lever pivoted at 19. The short arm 20 of the lever is slotted as shown, and adapted to the slot is a pin 21 on a link 22 which is connected to the lugs 17 of the slide 16. The long arm 23 of the lever 18 projects through a slot 24 in the vertical partition 25 of the base and through a slot 26 in the outer casing of the base 10. The link 22 is in the form of a lever having a short arm 27 to which is attached a coil spring 28, the opposite end of which is attached to a screw 29 which passes through a bracket 30 depending from the platform 11. On the outer end of this screw is a nut 31 by which the tension of the spring can be regulated. As soon as the operating lever 18 is released, the spring 28 returns the parts to their normal positions.

On the slide 16 is a pivot-pin 13 which extends through a seat plate 14, and on the pin 13 is a nut 13ª. The seat plate 14 is notched at 32—32, the notches being directly opposite one another and arranged so as to engage a pin 33 secured to the platform 11. This pin holds the seat plate in either of its two normal positions. The seat plate 14 has projecting portions 14ª, to which is secured a seat base plate 34 by screws 35 or other fastenings. On one edge of the base plate are knuckles 36 forming part of hinges 37. There are like knuckles on a plate 38 which is secured to a bottom board 39 of a seat structure 40.

The seat structure 40 may be of any shape desired. In the present instance there are two independent seat and inclined back sections 41, which are separated by a central arm 42 and in each side of the seat structure are arms 43. Secured to the underside of the bottom board 39 of the seat structure is a plate 44, shown in Fig. 6. This plate has a curved depending portion 45 adapted to a slot 46 in the seat plate 14 and to the slot 47 in the platform 11 of the base 10. The plate 44 has a projection 48 notched at each side as at 49, and these notches are adapted to receive a wedge-shaped projection 50 on a bracket 51. There are two brackets. One bracket is secured to one side of the base and the other bracket is secured to the opposite side of the base, as clearly shown in Fig. 3.

The slot 47 in the base 10 is of greater length than the slot 46 in the seat plate 14, so that, when the seat plate is moved longitudinally by pressing upon the foot-lever 18, the projeection 45 of the plate 44 will slide in the slot without releasing the seat structure so that it can be turned, but as soon as the back of the seat structure is raised on the hinges 37 from the position shown in full lines in Fig. 3 to that shown in dotted lines of said figure, then the portion 45 of the plate 44 is clear of the base and the seat structure can be turned on the pivot 13. The notch projection 48 is arranged so that when the seat structure is moved to its normal position near the side of the car for instance, one of the notched projections engages one of the lugs 50, holding the seat structure firmly to the base.

The seat plate 14 is circular and extends under the lips 52 on the brackets 51. These lips prevent the seat plate from tipping when the seat is occupied by a passenger.

Plate springs 53 are secured to the underside of the seat structure, and these springs bear against the platform 11 of the base 10. The springs are not sufficient to raise the rear end of the seat structure, but simply act as cushions when the seat structure is pressed down by the operator. The springs also make it easier for the operator to lift the seat at the back prior to the seat being turned.

Battens may be secured to the underside of the seat sections and these battens may rest on the extended platform of the base when the seat is in its normal position.

The operation is as follows:

The seat is located normally close to the side of the car, as shown in Fig. 2, so as to provide as much aisle room as possible and allow for a comparatively long seat. When it is desired to turn a seat section, the operator places his foot on the treadle 18 which moves the entire seat structure a sufficient distance from the side of the car to allow it to be turned on its pivot 13 and to disengage the notched projection 48 from the lug 50 with which it is engaged. The back of the seat is then raised to the position shown by dotted lines in Fig. 3, so that the portion 45 of the plate 44 which is secured to the underside of the seat structure is free of the platform, thus allowing the seat to be turned on its pivot. By raising the seat structure to the position shown by dotted lines, the back of the seat will clear the other seat structures. This arrangement allows the back to be inclined a sufficient distance to make a comfortable support for the occupant of the seat. When the seat structure is turned to its full extent, the seat structure is pushed down so that the projection 45 will enter the slot 47 in the opposite side of the base and when the foot-lever 18 is released the spring 28 will move the seat structure towards the side of the car, the seat plate 14 engaging the pin 33 and the notched plate 48 engaging a tapered lug 50 on one of the brackets 51, holding the seat structure rigidly in position.

I claim:

1. The combination of a base, a seat plate arranged to slide on the base and turn thereon, a base plate secured to the seat plate, a seat structure pivoted to the base plate, means for moving the seat structure longitudinally, the seat plate and the base being slotted, and a plate on the seat structure adapted to extend through said slots when the seat is in its normal position, said plate having a notched projection to engage a lug on the base to hold the seat structure rigidly to the base when in its normal position.

2. The combination of a base, two brackets thereon, one at each side of the base, each bracket having a lip, a seat plate mounted on the base and extending under the lips, a pin on the base, the seat plate being notched at each side to engage the pin when the seat structure is in either of its normal positions, each of said brackets having a tapered lug, a seat structure, and a base plate secured to the seat plate and to which the seat structure is pivoted, said seat structure having a plate secured to its underside and having a notched projection so arranged that when the seat is moved to its normal position the projection engages the lug on one of the brackets, preventing the seat being raised, said lug releasing the seat structure as soon as the seat structure is moved longitudinally on the base.

3. The combination of a base having a slotted platform, a block mounted on the base and having a projection extending into the slot in the platform, a foot-lever connected to the block for moving the block in one direction, a spring for moving the block in the opposite direction, a seat plate pivotally mounted on the block, a pin on the base arranged to be engaged by the seat plate when the plate is in its normal position, a seat structure pivoted at the front edge of the seat plate so that the back can be tilted forward, a projection on the seat structure arranged to engage the seat plate and the platform of the base, a second projection on said seat structure, having a notch at each side, lugs on the platform arranged to be engaged by the notches of the last mentioned projection, and springs secured to the seat structure and resting upon the base so as to cushion the seat structure.

WILLIAM J. MAYER.